United States Patent Office 3,215,471
Patented Nov. 2, 1965

3,215,471
ENHANCING POTASSIUM CHLORIDE DISSOLUTION BY THE ADDITION OF FERRO- AND FERRICYANIDES
Harry E. Gunning, Edmonton, Alberta, Canada, assignor, by mesne assignments, to Esso Production Research Company, a corporation of Delaware
No Drawing. Filed Feb. 28, 1963, Ser. No. 261,823
17 Claims. (Cl. 299—4)

The present invention broadly pertains to the treatment of solid mixtures of sodium and potassium chlorides with an aqueous solvent. It pertains more particularly to a method of dissolving potassium chloride preferentially from a mixture of crystalline sodium and potassium chlorides using an aqueous solvent. The invention especially relates to a method of extracting potassium chloride from minerals containing both potassium chloride and sodium chloride crystals—e.g., sylvinite.

Potassium frequently occurs in nature as solid deposits of potassium chloride crystals associated with sodium chloride crystals. Mechanical methods, as well as solution methods, have been used or suggested for use in mining such deposits. The methods have been applied to both shallow and deep deposits. With respect to deep deposits, solution methods might at first appear to be more attractive and economical to employ than mechanical methods. In fact, however, certain shortcomings of solution methods have led at least some operators to prefer mechanical methods over solution methods for mining such deposits.

In the case of mechanical mining methods, shovels, drills or the like are used to physically remove portions of a mixed potassium chloride-sodium chloride deposit. The portions thus removed are generally crushed or otherwise reduced in particle size and then leached with an aqueous solvent. The solvent normally used is a brine consisting of water saturated with sodium chloride and undersaturated with respect to potassium chloride.

In the case of solution mining, the mixed salt deposit is contacted directly with an aqueous solvent. As in the leaching phase of the mechanical mining method, the solvent is usually a brine solution saturated with respect to sodium chloride and unsaturated with respect to potassium chloride. After being contacted with the deposit for a time sufficient to disolve additional potassium chloride, the solvent is returned to the surface of the earth. There the potassium chloride is recovered from the solvent, and the latter thereupon recirculated to the deposit.

In leaching mechanically mined potassium chloride deposits and in solution mining such deposits advantage is taken of a difference in the solubility characteristics of sodium chloride and potassium chloride in aqueous solvents. Thus, potassium chloride is substantially more soluble in hot water than in cold water. Sodium chloride, on the other hand, has about the same maximum solubility in hot water that it does in cold water.

Accordingly, in leaching or solution mining a mixture of potassium chloride and sodium chloride salts, a hot aqueous solvent such as water which is substantially saturated with respect to sodium chloride and unsaturated with respect to potassium chloride is contacted with the mixture. The solvent preferentially dissolves the potassium chloride and becomes more saturated with respect to this salt. When sufficient potassium chloride has been dissolved, the resulting solution is removed from contact with the remaining undissolved salts and is reduced in temperature. At the lower temperature, potassium chloride preferentially crystallizes from the solution. The solid crystallized potassium chloride is separated from the mother liquor, and the latter material is recirculated for further contact with the solid salt mixture. Since little or none of the sodium chloride precipitates from solution, the mother liquor automatically remains substantially saturated with respect to this salt throughout the overall process.

While the differential solution technique of mining and separating potassium chloride from crystalline mixtures of potassium and sodium chlorides has been generally effective, further improvements in this technique are very desirable. This is especially the case in solution mining deep salt deposits, where the rate of attack of the aqueous solvents on the potassium chloride mineral deposits has been so slow as to render the technique economically and technically unattractive. Efforts have been made to improve the technique by increasing the temperature of the solvent down-the-hole so as to promote solubility. These efforts, however, have not been sufficiently successful.

It is, accordingly, an object of this present invention to provide an improved method of preferentially dissolving potassium chloride from a mixture of crystaline potassium and sodium chlorides. It is a more particular object of the invention to provide an improved method of solution-mining potasium chloride from subterranean deposits of such salt mixtures—e.g., sylvinite. It is also a more particular object of the invention to provide an improved method of purifying or separating potassium chloride when associated with sodium chloride in crystalline admixture.

These and related objects of the invention may be realized by contacting a mixture of solid sodium and potassium chlorides with an aqueous solvent. The solvent must be relatively unsaturated with respect to potassium chloride and must contain a minor amount of a water-soluble ferrocyanide or ferricyanide. The concentration of the ferricyanide or ferrocyanide must be sufficient to increase the rate of solution of the crystalline potassium chloride within the solvent. For best results, the solvent should contain an amount of disolved sodium chloride such that it cannot dissolve further sodium chloride from the solid salt mixture.

Suitable ferricyanides and ferrocyanides for use in the practice of this invention include members of the general class of water-soluble ferricyanides and ferrocyanides. Prefered members are the water-soluble alkali metal and alkaline earth metal ferrocyanides and ferricyanides. Especially prefered are the sodium and potassium ferricyanides and ferrocyanides.

Experiments with potassium chloride minerals have indicated that very small quantities of ferricyanides or ferrocyanides are needed to realize the objectives of this invention. In the case of sylvinite, for example, the use of as little as 20 parts per million of potassium ferricyanide in a NaCl-saturated brine has markedly increased the solvent action of the brine. The experiments have also indicated that concentrations much smaller than 20 parts per million may also be used to good effect. In general, however, it is contemplated that concentrations in the range of 50 parts per million to 500 parts per million of a water-soluble ferricyanide or ferrocyanide will be used.

The exact mechanism performed by the ferrocyanide or ferricyanide in the practice of the invention is not entirely understood. Since very little loss of the ferricyanide or ferrocyanide has been observed in tests of the invention, it appears that the action of these materials may be catalytic in nature. To the extent that losses of ferrocyanide or ferricyanide do occur, it is apparent that additional mounts of these quantities may be added to the system.

Since the differential solution principle employed in the practice of the invention relies upon operating at different temperature levels, it is also apparent that the step of contacting an aqueous solvent with a salt mixture should be carried out at a temperature greater than the subsequent recrystallization step. In this connection, it is generally preferred that the solvent be heated to a temperature greater than the recrystallization temperature, inasmuch as solubility rates tend to increase with increasing temperatures. Alternatively, the solution resulting from contacting the solvent with the mixed salts may be chilled or otherwise cooled to a temperature below the temperature of the solution step.

With respect to the working of deep KCl mineral deposits, the present invention is applicable to either the single-well or the two-well method of solution mining. As is well known in the art, the single-well method is used with wells conventionally provided with two concentric pipe strings. The solvent is pumped down to the deposit of interest through one of the strings, and the resulting solution is returned to the surface of the earth through the other string.

In the two-well method of solution mining, at least two laterally spaced wells are provided between a mineral deposit and the surface of the earth. One of the wells is conventionally used as an input well, and the other as an output well. Referring specifically to a mineral deposit such as sylvinite, water which is unsaturated with respect to potassium chloride is pumped down to the deposit through the input well and then through the deposit to the output well. If the deposit is sufficiently permeable, the solvent may be passed directly through the deposit from one well to the other. However, in the event the deposit is too impermeable for such direct solvent, one or more channels may be created through the deposit. Thus, hydraulic fractures may be generated within the deposit between the wells. In such cases, the aqueous solvent itself may be used as a fracturing fluid. Alternatively, a channel may be formed simply by "washing through" the deposit from one well to the other using the solvent. In any event, once a channel has been established between the wells, mining can proceed by pumping an aqueous solvent through the channel.

The best mode contemplated for carrying out the present invention in either a single-well or two-well operation comprises circulating an aqueous brine from the surface of the earth to the deposit. The brine flowing down to the deposit should comprise water sufficiently saturated with sodium chloride such that it will dissolve additional sodium chloride from the deposit. The brine must also be undersaturated with respect to potassium chloride, so that it can dissolve potassium chloride from the deposit. The brine must further contain a minor but sufficient amount of a water-soluble ferricyanide or ferrocyanide to increase the rate of solution of the potassium chloride in the brine. As mentioned earlier, ferrocyanide or ferricyanide concentrations in the range of about 50 to 500 parts per million within the brine are especially contemplated.

It will be apparent that the solution process may be started using either a sodium chloride brine or simply fresh water. Fresh water will quickly become saturated with sodium chloride upon contact with the mined deposit and will automatically remain substantially saturated. In the event water must be added during the process to maintain a sufficient supply of solvent in the system, such water may be either fresh water or a brine. In either case it, too, will rapidly become saturated with respect to sodium chloride.

Gases or other fluids lighter than the circulating brine and inert to the brine and to the salt deposit may be injected into the deposit to help assure a proper cavity shape. Again, the brine may be diluted with water on occasion if increased attack on the salt deposit is desired.

The temperature of subterranean potassium chloride mineral deposits is quite often greater than ambient atmospheric temperature. Formation temperatures, therefore, will generally help to promote solubility of potassium chloride in the solvent. In this regard, additional heating of the solvent may be achieved by means of down-the-hole heaters or the like. It is generally contemplated that the solvents of the present invention be heated to temperatures of about 150 to 200° F. prior to contacting them with the mineral to be treated. Temperatures in the neighborhood of 190 to 200° F. appear especially attractive. Lower temperatures may also be desired on occasion, as for example where the rate of solvent attack on the mineral is to be retarded.

Contact time of the solvent with the mineral should, of course, be kept to a minimum consistent with adequate potassium chloride recoveries. In this regard, it is a particular feature of the invention that the increased rates of solubility resulting from the use of ferricyanides and ferrocyanides markedly reduce the contact times otherwise required for potassium chloride solution to take place.

Controlled experiments have clearly demonstrated the ability of water-soluble ferrocyanides and ferricyanides to promote the solvent action of aqueous brines on potassium chloride crystals in the presence of sodium chloride crystals. Thus, in one test, two-inch cubes of sylvinite (containing about 19% $K_2O$ as potassium chloride, about 7 to 8% insolubles, and the balance sodium chloride) were placed at about 80° F. in separate vessels containing (1) distilled water, and (2) distilled water saturated with sodium chloride, and (3) distilled water saturated with sodium chloride to which about 200 p.p.m. potassium ferricyanide had been added. The sylvinite dissolved slowly but completely in the distilled water. In the brine containing no ferricyanide ions, substantially no attack on the sylvinite was observed. However, when 200 p.p.m. of potassium ferricyanide was added to the brine, the rate of attack on the sylvinite was greatly increased. In particular, the brine was observed to preferentially attack the crystals of sylvites (KCl) and, in effect, severely and selectively etch the sylvinite of its sylvite content.

In another test, a block of sylvinite about 3 inches wide, 5 inches high and 15 inches long was encased in a Lucite box. The sides and top of the block were sealed within the box by the use of an epoxy cement. The bottom surface of the block was not cemented, and it was therefore possibly to pass a saturated sodium chloride brine through the box along the lower surface of the block. This test, again, was carried out at about 70 to 80° F.

Initially, the saturated brine containing no ferricyanide or ferrocyanide was passed through the box beneath the sylvinite block. The effluent brine containing dissolved potassium chloride was passed into a vessel where the dissolved potassium chloride was crystallized out of solution. The resulting mother liquor was then recirculated to the sylvinite block.

After about four days' operating time, the degree of attack on the block by the brine was noted. About 20 p.p.m. of potassium ferricyanide were then added to the brine with the result that the solvent attack on the brine was roughly doubled. Thus, at the end of about two days' operation, roughly the same amount of ore had been attacked by the ferricyanide-containing brine as had been attacked in the previous phase using simply the brine itself.

While the present invention has been demonstrated to be particularly effective in the solution mining of sylvinite, it is contemplated to also be effective in the mining of other potash ores containing potassium chloride in admixture with sodium chloride—e.g., carnallite.

What is claimed is:
1. A method of preferentially dissolving potassium chloride from a mixture of potassium chloride and sodium chloride crystals which comprises contacting the crys- tals with water substantially saturated with respect to sodium chloride and unsaturated with respect to potassium chloride, the said water also containing a minor but sufficient amount of a member of the class consisting of water-soluble ferricyanides and ferrocyanides to increase the rate of solution of said potassium chloride crystals in the water.

2. A method of recovering potassium chloride from an ore containing potassium chloride and sodium chloride crystals which comprises contacting said ore with water substantially saturated with respect to sodium chloride and unsaturated with respect to potassium chloride, said water also containing a minor but sufficient amount of a member of the class of compounds consisting of the water-soluble ferricyanides and ferrocyanides to increase the rate of solution of said potassium chloride crystals in said water.

3. A method of dissolving potassium chloride crystals which comprises contacting said crystals with water containing a minor amount of a water-soluble compound which is a member of the class of compounds consisting of the water-soluble ferricyanides and ferrocyanides, the amount of said compound being sufficient to increase the rate of solution of said potassium chloride crystals in said water.

4. A method as defined in claim 3 wherein said water contains at least about 20 parts per million of a compound which is a member of the class of compounds consisting of the water-soluble ferricyanides and ferrocyanides.

5. A method as defined in claim 3 wherein said water-soluble compound is a member of the class of compounds consisting of the water-soluble alkali metal and alkaline earth metal ferricyanides and ferrocyanides.

6. A method as defined in claim 3 wherein said water-soluble compound is a member of the class of compounds consisting of the alkali metal ferricyanides and ferrocyanides.

7. A method as defined in claim 3 wherein said compound is potassium ferricyanide.

8. In a method of recovering potassium chloride from an ore containing both potassium chloride and sodium chloride crystals which comprises contacting said ore with water containing sodium chloride at a first temperature for a time sufficient to substantially saturate said water with respect to potassium chloride, said water containing a minor but sufficient amount of a water-soluble compound to increase the rate of solution of said potassium chloride in said water, said compound being selected from the class of compounds consisting of the water-soluble ferricyanides and ferrocyanides, cooling the resulting solution to a second temperature sufficient to crystallize at least a portion of said potassium chloride out of solution, and separating said crystallized potassium chloride from said solution.

9. A method of recovering potassium chloride from a subterranean ore deposit containing potassium chloride and sodium chloride, which comprises contacting said deposit with an aqueous solvent comprising water and a minor but sufficient amount of a chemical compound to increase the rate of solution of said potassium chloride in said aqueous solvent, said compound being a member of the class of compounds consisting of the water-soluble alkali metal and alkaline earth metal ferricyanides and ferrocyanides.

10. A method as defined in claim 9 in which said aqueous solvent contains between about 50 and 500 parts per million of said compound.

11. A method of recovering potassium chloride from a subterranean mineral deposit containing potassium chloride and sodium chloride crystals which comprises drilling a well from the surface of the earth into said deposit, injecting an aqueous solvent down the well and into said deposit, contacting said injected solvent with said deposit under conditions to substantially saturate said solvent with respect to potassium chloride, said solvent comprising water containing a minor but sufficient amount of a compound selected from the class consisting of the water-soluble ferricyanides and ferrocyanides to increase the rate of solubility of said potassium chloride in said water under said conditions, returning the solvent substantially saturated with potassium chloride to the surface of the earth and cooling same sufficiently to recrystallize at least a portion of said dissolved potassium chloride from said solvent, separating said recrystallized potassium chloride from said solvent, and recirculating said separated solvent to said deposit for further contact with said deposit.

12. A method as defined in claim 11 wherein said solvent substantially saturated with potassium chloride is returned to the surface of the earth through the same well as said solvent is injected into said deposit.

13. A method as defined in claim 11 wherein said solution is returned to the surface of the earth through a well spaced from the well in which said aqueous solvent is injected into said deposit.

14. A method of mining potassium chloride from a subterranean mineral deposit containing potassium chloride crystals which comprises cycling an aqueous solvent between the surface of the earth and said deposit, maintaining said solvent in contact with said deposit during each cycle for a period of time sufficient to dissolve potassium chloride from said deposit, said aqueous solvent comprising water and a minor amount of a compound selected from the class of compounds consisting of the water-soluble ferricyanides and ferrocyanides, said amount being sufficient to increase the rate of solubility of said potassium chloride in said water, recrystallizing at least a portion of the dissolved potassium chloride from said solvent when the aqueous solvent is at the surface of the earth during a portion of each said cycle, and separating said recrystallized potassium chloride from said solvent.

15. A method of mining potassium chloride from a subterranean deposit containing crystalline potassium chloride which comprises drilling laterally spaced wells from the surface of the earth into said deposit, forming a flow channel between said wells through said deposit, and flowing an aqueous solvent through said channel between said wells under conditions to dissolve potassium chloride from said deposit into said aqueous solvent, said aqueous solvent comprising water containing a compound selected from the class consisting of the water-soluble ferricyanides and ferrocyanides, said compound being present in said aqueous solvent in a minor but sufficient amount to increase the rate of solubility of said crystalline potassium chloride in said water.

16. A method as defined in claim 15 wherein said channel is formed by hydraulically fracturing said deposit.

17. A method as defined in claim 15 wherein said channel is formed by washing through said deposit.

References Cited by the Examiner

UNITED STATES PATENTS

| | | | |
|---|---|---|---|
| 1,139,741 | 5/15 | Carter | 252—363.5 |
| 1,905,833 | 4/33 | Feagley | 252—363.5 |
| 2,642,335 | 6/53 | May | 23—89 |
| 2,847,202 | 8/58 | Pullen | 262—3.2 |
| 3,022,986 | 2/62 | Brandt | 262—3.2 |
| 3,036,884 | 5/62 | Kaufmann | 23—89 |
| 3,058,729 | 10/62 | Dahms | 23—38 X |
| 3,095,282 | 6/63 | Wilson | 23—312 |

NORMAN YUDKOFF, *Primary Examiner.*